H. H. BAER.
CLUTCH MECHANISM.
APPLICATION FILED NOV. 19, 1910.
984,523.
Patented Feb. 21, 1911.
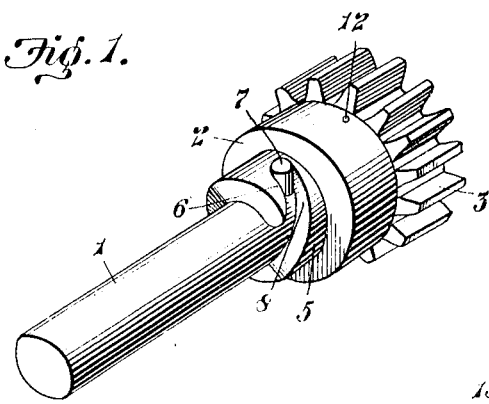
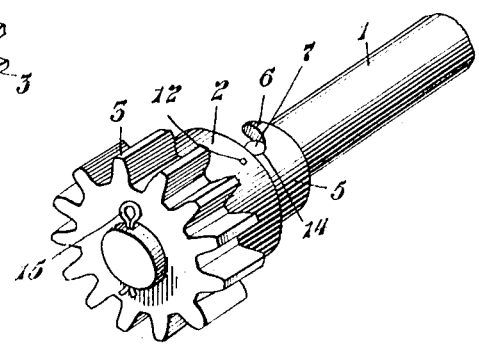
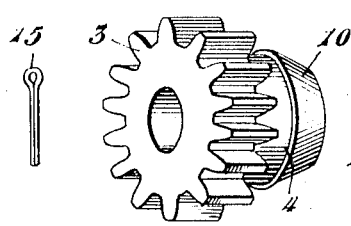
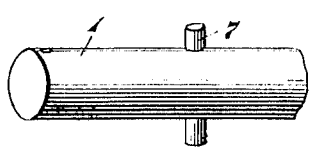
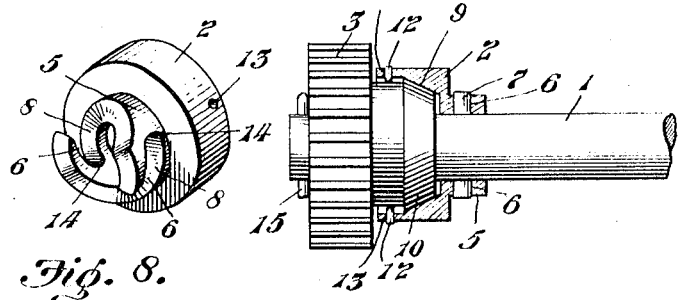
Witnesses
J. H. Bishop.
Irene Lutz
Inventor
Harry H. Baer.
By Bondo Miller
Attorneys

UNITED STATES PATENT OFFICE.

HARRY H. BAER, OF ORRVILLE, OHIO, ASSIGNOR OF ONE-SIXTH TO WILLIAM BAER, ONE-THIRD TO RALPH A. KINNEY, AND ONE-THIRD TO HOMER E. NEWMAN, ALL OF ORRVILLE, OHIO.

CLUTCH MECHANISM.

984,523.

Specification of Letters Patent. Patented Feb. 21, 1911.

Application filed November 19, 1910. Serial No. 593,290.

*To all whom it may concern:*

Be it known that I, HARRY H. BAER, a citizen of the United States, residing at Orrville, in the county of Wayne and State of Ohio, have invented certain new and useful Improvements in Clutch Mechanism; and I do hereby declare that the following is a full, clear, and exact description thereof.

The objects of the present invention are first to provide an improved clutch mechanism whereby the action will be positive and second to so arrange the parts that they will occupy but a small space and at the same time provide devices for locking the movable pieces together or leaving them independent of one another according as one of the pieces or parts is moved in one direction or the other. That is to say to couple the driven pinion and shaft together in such a manner that the pinion and shaft will rotate together, or allow the pinion to rotate independent of the shaft. These objects together with other objects readily apparent to those skilled in the art I attain by the construction illustrated in the accompanying drawings, although my invention may be embodied in a variety of other mechanical forms, the construction illustrated being chosen by way of example.
In the accompanying drawings Figure 1 is a perspective view of my clutch mechanism. Fig. 2 is a similar view showing the clutch in a different position. Fig. 3 is a detached view of the shaft and its pin. Fig. 4 is a detached view of the combined sleeve and one clutch member. Fig. 5 is a detached view of the spring. Fig. 6 is a detached perspective view of the pinion and its integral clutch member. Fig. 7 is a sectional view of the sleeve or one clutch member showing the same properly mounted upon the shaft and the integral pinion clutch member, also showing the pinion properly mounted upon the shaft. Fig. 8 is a detached perspective view of the combined sleeve and clutch member showing the same in a different position from that in Fig. 4.

Similar numerals of reference indicate corresponding parts in all the figures of the drawing.

In the accompanying drawing 1 represents the shaft which is to be journaled in the usual manner and upon which shaft are loosely mounted the combined sleeve and clutch member 2, the pinion 3 and its integral clutch member 4. The clutch member 4 and pinion 3 are preferably formed integral, but it will be understood that these parts may be made separate and connected together in any convenient and well known manner without departing from the nature of my invention as the only object desired so far as these parts are concerned is that they rotate in unison.

The clutch member 4 is provided with the lateral extension or hub 5 which hub is provided with the cam faced recesses 6 in which recesses is normally located the pin 7 which pin is securely connected to the shaft 1, the said pin being the only part of the clutch fixed to and at all times rotatable with the shaft.

The cam faced recesses are so arranged that when the pinion 3 is rotated in one direction the said pinion will turn idly upon the shaft, but when rotated in the opposite direction the shaft 1 will be rotated with said pinion, said pinion and shaft being coupled together as hereinafter described.

When the pinion is rotated in the direction to cause the cam face 8 to press or bear against the pin 7, said cam face will impart a slight sliding movement upon the shaft 1 and toward the pinion 3 thereby bringing the beveled faces 9 and 10 into frictional contact with each other thereby causing the clutch member 2 and the pinion 3 to rotate in unison and by reason of the wedge action of the inclined face 8 upon the pin 7 cause the shaft 1 to rotate with the pinion 3 and the clutch members 2 and 4.

For the purpose of insuring the proper coupling up of the clutch members 2 and 4, and also the shaft 1 the frictional spring 11 is provided which spring is connected to the combined sleeve and clutch member 2 by means of the lateral tangs 12 formed upon said spring, and the aperture 13 formed in the sleeve or clutch member 2. It will be understood that the friction between the clutch members 2 and 4 need only be sufficient to rotate the clutch member 4 with the pinion 3 when motion is first imparted to said pinion, otherwise the pinion might run idly upon the shaft when rotated in the direction designed to couple the pinion and shaft together, but by means of the interposed spring sufficient friction is maintained to instantly couple the clutch members 2 and 4 together and after the initial starting of the pinion the clutch members will be positively coupled together by means of the pin 7 and the inclined or cam face 8.

When the pinion 3 is rotated in the opposite direction from the direction when it is desired to couple the shaft 1 with said pinion the clutch member 2 by reason of the spring 11 is driven with the pinion by frictional contact a sufficient distance to release the pin from the inclined face 8 and thereby release the frictional contact of the beveled faces 9 and 10, said clutch member 2 being held against further rotation by means of the pin 7 striking the walls 14 formed at the bases of the cam faced recesses 6. For the purpose of insuring the proper sliding movement of the clutch member 2 upon its shaft in the direction away from the pinion 2, so as to positively disengage the beveled faces 9 and 10 upon the clutch members 2 and 4 the outer walls or boundaries 14 of the cam faced recesses 6 come in contact with the pin 7 and slide the clutch member 2 upon its shaft. It will be understood that in order to hold the pinion 3 together with the combined sleeve and clutch member 2 and the clutch member 4 in proper relationship the cotter pin 15 should be provided or its equivalent.

It will be understood that the device is exceedingly simple and at the same time positive in its actions, both in coupling the shaft and pinion together and also in uncoupling the shaft and pinion.

I claim:—

1. In a clutch mechanism, the combination of a shaft, a pinion loosely mounted on said shaft, a clutch member rotatable with said pinion, a slidable clutch member loosely mounted upon said shaft, said slidable clutch member provided with a lateral extension or hub, said hub provided with cam faced recesses, a pin fixed to and rotatable with the shaft, said pin adapted for contact with the walls of the cam faced recesses and a spring interposed between the clutch members substantially as and for the purpose specified.

2. In a clutch mechanism, the combination of a shaft, a pinion loosely mounted on said shaft, a clutch member rotatable with said pinion, a slidable clutch member loosely mounted upon said shaft, said slidable clutch member provided with a lateral extension or hub, said hub provided with cam faced recesses, a pin fixed to and rotatable with the shaft, said pin adapted for contact with the walls of the cam faced recesses and a spring interposed between the clutch members, said clutch members provided with contact beveled faces, substantially as and for the purpose specified.

3. In a clutch mechanism, the combination of a shaft, a pinion loosely mounted upon said shaft, said pinion provided with a clutch member, a slidable clutch member loosely mounted upon the shaft, said clutch member provided with a hub having inclined faces, a pin fixed to and rotatable with the shaft, said pin adapted for engagement with the inclined faces of the hub of the slidable clutch member and means for initiatively coupling the clutch members together, said clutch members having beveled faces adapted to rotatably connect said clutch members together, substantially as and for the purpose specified.

In testimony that I claim the above, I have hereunto subscribed my name in the presence of two witnesses.

HARRY H. BAER.

Witnesses:
G. A. STARN,
C. D. SWAN.